United States Patent [19]
Tanner

[11] 3,731,797
[45] May 8, 1973

[54] SPLIT BEAN CLEANING METHOD AND APPARATUS

[75] Inventor: Harold D. Tanner, Cahone, Colo.
[73] Assignee: Harold R. Tanner, Cahone, Colo.
[22] Filed: May 18, 1972
[21] Appl. No.: 254,453

[52] U.S. Cl. ................................. 209/78, 209/108
[51] Int. Cl. .......................................... B07b 13/00
[58] Field of Search ....................... 209/78, 108, 76

[56] References Cited
UNITED STATES PATENTS 515,776  3/1894  Knapp .............................. 209/108
1,164,986  12/1915  Brockwell ........................... 209/78

Primary Examiner—Richard A. Schacher
Attorney—Richard D. Law

[57] ABSTRACT

A relatively thick layer of soft, resilient, foamed, elasto-plastic material pressed on split beans in a single layer removes goathead weed pods from the beans. In one form, a roller coated with the elasto-plastic, foamed material rolls over a single bean layer for cleaning the same.

12 Claims, 3 Drawing Figures

Patented May 8, 1973 3,731,797

SPLIT BEAN CLEANING METHOD AND APPARATUS

BACKGROUND OF THE INVENTION

In certain areas in the southwestern part of the United States, pinto beans are a substantial crop in the dry land farming. In many of these areas pre-emergence herbicides are used in an attempt to control weeds, but after emergence of the bean sprouts chemical weeding can not be achieved. In such conditions, weeds grow concurrently with the beans. One particular type of weed, called a goathead weed, grows profusely with the beans. The goathead weed produces a seed pod having two thorns diverging from one end of the pod so that it faintly looks like a goathead with horns. The cleaning of whole beans is readily accomplished as the goathead pod being slightly smaller and lighter is fairly easily removed from the whole beans by screening. However, with split beans, the goathead weed pod is substantially the same size and substantially the same weight as a split bean so that it passes through the screening operations with the split beans and contaminates the beans.

Split beans, also called bean splits, comprise a substantial amount of the recovery of the beans from the threshing operation, however, they are not as readily salable as the whole beans. Bean splits are normally used for refried beans, and economically they must be recovered for sale to make the bean farming operation a success.

The Invention

The present invention provides a method and apparatus for removing goathead weed pods from bean splits essentially by pressing a soft, resilient foamed elastoplastic material onto a single layer of bean splits so as to pick up the goathead weed pods from the beans. In one form, an endless belt is provided with a single layer of bean splits spread on the belt and a roller covered by foamed elastoplastic material is pressed onto the bean splits to pick up the goathead weed pods.

Included among the objects and advantages of the present invention is a method of cleaning bean splits by removing goathead weed pods with a soft, elastic, foamed elasto-plastic material.

Another object of the invention is to provide apparatus for removing goathead weed pods from bean splits.

A still further object of the invention is to provide a method of continuously pressing a soft resilient foamed elasto-plastic material onto a single layer of bean splits to thereby remove goathead weed pods from the layer of bean splits.

Yet another object of the invention is to provide apparatus for cleaning bean splits in which an endless belt is provided with a single layer of bean splits and a wheel covered by a soft, resilient, foamed elasto-plastic material is pressed onto the bean layer to pick up goathead weed pods essentially without displacing the beans on the belt.

A still further object of the invention is to provide a continuous method of removing goathead weed pods from bean splits by rolling a continuous band of soft, resilient foamed elasto-plastic material on a single layer of bean splits moving along a predetermined course under said continuous band.

These and other objects and advantages of the invention may be readily ascertained by referring to the following description and appended illustrations in which.

Figure 3:
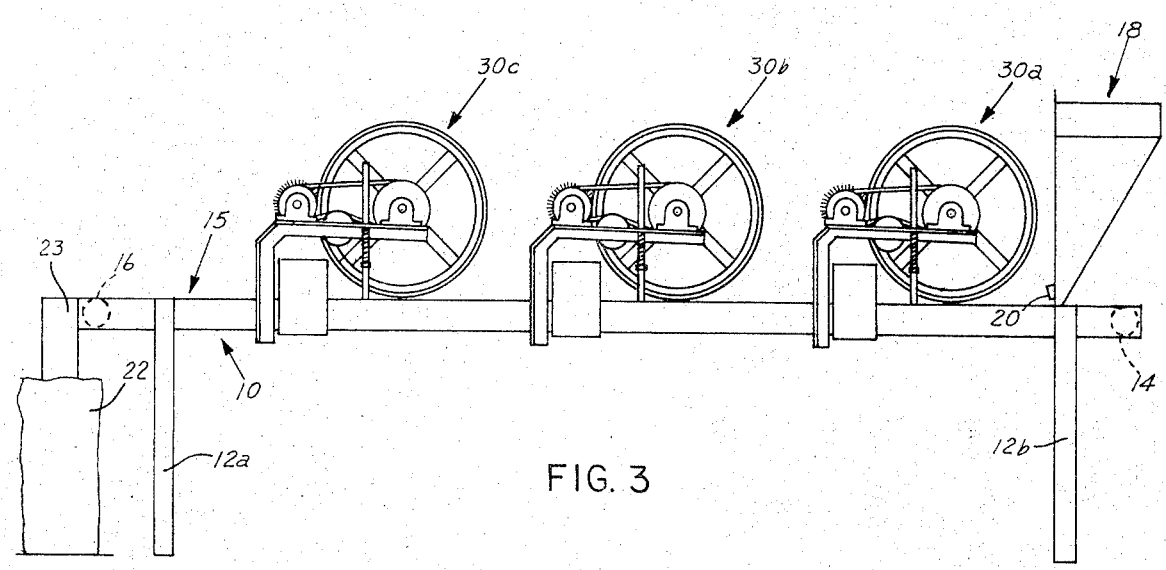
FIG. 3 is a side elevational view of a composite machine for cleaning bean splits including three cleaning stations.

In the device illustrated in FIG. 3, a frame shown in general by numeral 10 is mounted on floor support frames 12a and 12b for supporting the frame above the ground in working position. Mounted on the frame 10 is a head pulley 14 at one end and a tail pulley 16 at the opposite end for supporting and rotating a belt conveyor 15, described in FIG. 1. The top stretch 15a of the belt moves generally from the head pulley 14 toward the tail pulley 16. A split bean supply bin or hopper shown in general by numeral 18, includes an adjustable discharge door 20 for controlling feeding of the beans from the hopper 18 onto the top stretch 15a of the belt, with the feed arranged to provide a single layer of beans on the belt. Three cleaning stations, 30a, 30b and 30c, are mounted on the frame 10 with a cleaning wheel mounted above the top stretch of the belt, described below in detail. Each wheel is arranged to roll over the beans on the belt. The belt passes over the tail pulley 16 discharging beans through a chute 23 into the bag 22. The catch bag 22, obviously, is changed for an empty one as it is filled. The discharge chute 23 provides an easy means for filling the bag 22 from the belt conveyor.

Figure 1:
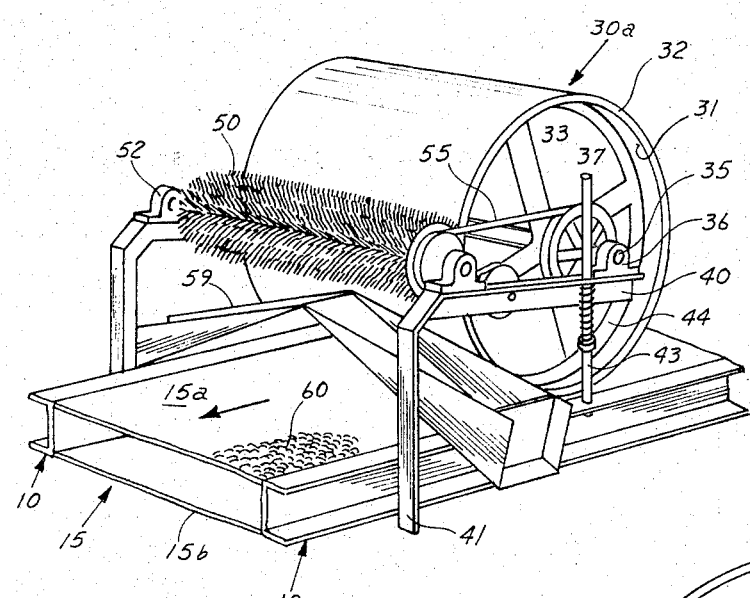
FIG. 1 is a perspective view of one form of apparatus, according to the invention, including a rotary weed-pod pick-up wheel and a moving belt for bean splits.
Figure 2:
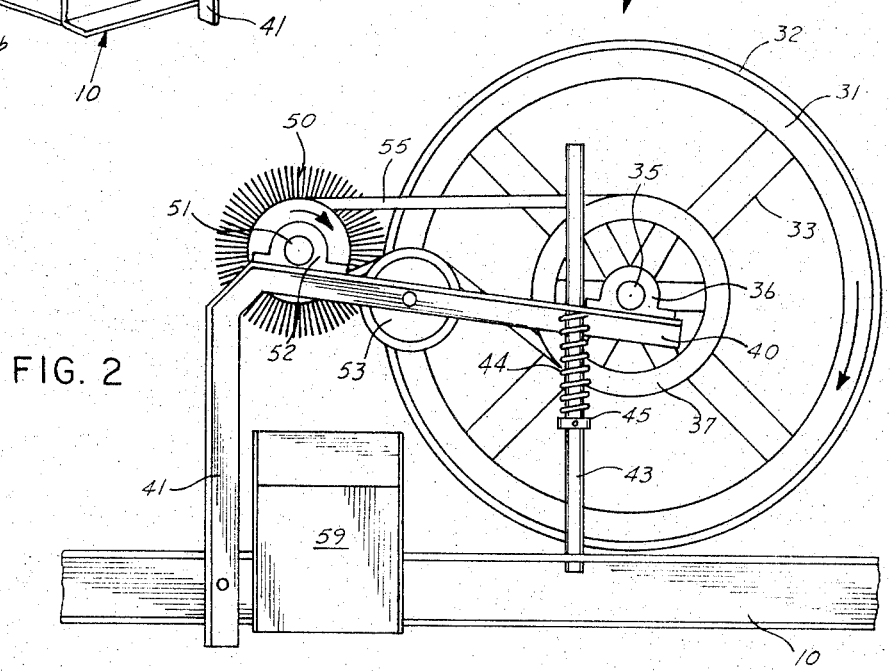
FIG. 2 is a side elevational view, in larger detail, of the device of FIG. 1.

Each cleaning station, shown in detail in FIGS. 1 and 2, is similar to the others to provide three stations in the form shown. It is, of course, obvious that as many stations as may be desirable may be placed along the stretch of a belt. Therefore, any number of cleaning stations may be used for cleaning the bean splits.

Each bean cleaning station includes a rotary drum 31 covered by a relatively thick layer of soft, resilient, foamed elasto-plastic material 32, which is cemented or otherwise sealed to the outside of the drum. As shown in FIGS. 1 and 2, the drum 31 is hollow with spokes 33 providing means for holding a hub into which a shaft 35 is mounted. The shaft in turn is journaled in a bearing set 36 (one on each end of the shaft), and a pulley wheel 37 is mounted on the shaft 35. The bearing set 36 is mounted on a generally horizontal, adjustable frame member 40 which in turn depends from an upright mount 41. The mount 41 supports the drum above the top stretch 15a of the belt 15 (a frame member is provided on each side). A tension shaft 43 is secured to the frame 10 and a helical spring 44 attached to the frame member 40 provides means for applying downward pressure of the drum against the top stretch of the belt 15a. Tension is provided by moving a movable collar 45 attached to the spring downwardly along the shaft 43 and securing it in position by means of a set screw through the collar to the shaft 43. The spring 44 is, therefore, in tension pulling the horizontal member 40 downwardly and the attached drum onto the belt. Mounted on the frame member 40 adjacent the drum is a brush element 50. The brush is mounted on a shaft 51 journaled in a bearing block 52 mounted on the frame 40. An adjustable idler 53 provides means for controlling tension on belt 15, to provide sufficient tension for driving the brush by a belt 55 from the drum 31. The brush 50 is mounted with its bristle tips brushing the outside of the elasto-plastic material 32 on the drum 31, so that the brush sweeps adhering matter from the elasto-plastic material. As weed pods are removed from the drum they are brushed into a chute 59. This exhausts to both sides of the belt conveyor for removal of weeds picked up by the drum.

Preferably the brush 50 is a nylon bristle brush, rotated against the elasto-plastic material for removing extraneous material which adheres to the surface of the elastic material. The brush is adjustable so as to be mounted at an optimum distance for brushing the drum.

In using the device of the invention, the hopper 18 is filled with bean splits and a thin layer, preferably a single layer, of bean splits is passed onto the top stretch 15a of the belt conveyor. Beans 60, FIG. 1, illustrate the single layer of bean splits which are passed onto the surface of the belt conveyor. In some instances it may be desirable to use vibrators on the belt for maintaining a single layer, and to, also, shuffle the beans around slightly to provide easy access of the flexible material to the goathead weed pods. The drums are pressed tightly on to the belt conveyor by adjusting the tension on both sides of each drum. Movement of the belt conveyor causes rotation of the drums in the direction of travel, shown by the arrow in FIG. 2, and the belt drive 55, likewise, turns the brush in the same direction. The pulley 37 on the drum is larger than the pulley on the brush so that the brush rotates faster than the drum. This faster rotation brushes the surface of the drum into the discharge chute 59, and anything adhering to the drum will be brushed into the discharge chute. As shown in FIG. 3, three stations, one following the other, on the belt conveyor, provide three stations for cleaning the bean splits. Each cleaning brush is provided with a weed discharge chute.

In some cases it may be desirable to support the belt conveyor at each cleaning station to permit application of desired drum pressure. This may be conventionally by plates, rollers, etc.

In one size, about a 2-foot wide belt is mounted on a frame with three drums. Each drum is about 24 inches in diameter, and is mounted in cleaning operation above the belt. The drums are covered with from one-half inch to 2 inches of soft, resilient, foamed, elasto-plastic material such as foamed polyethylene, polystyrene, polyurethanes, poly (vinyl chlorides), etc., and similar synthetic resins which are foamed. A foamed rubber, commonly called sponge rubber, may be used. The belt rotates relatively slowly to give the foamed material a good opportunity to pick up the goathead weed pods, and the slower rotation prevents the weed pods from being flipped off from the surface of the drum by centrifugal force. By pressing the drums against the belt, the belt drives the drum and the drum moves over the bean splits essentially without moving the beans from their position on the belt. Essentially, the beans are fairly static on the belt, and are static as they pass under the drum in the cleaning operation. The soft, resilient material permits the drum to be pressed under reasonable tension, against the beans and any weed pods which may be with the beans. In this manner, the beans are not injured or further spread while the weed pods with their horns are pressed into the foam material. The pods stick to the foam material until they are brushed off by the brush. In this manner, the beans are cleaned of the weed pods of approximately the same size and weight.

While the description has been directed particularly to goathead weed pods, it is obvious that the foamed material will pick up weed seeds and pods which are prickly or have thorns, etc. on them. Some other types of debris will also stick to some types of foamed material, and it therefore cleans beyond the prickly weed seeds.

I claim:
1. A method of cleaning bean splits comprising, forming a thin layer of such bean splits on a planar surface, pressing a soft, resilient, foamed material on said thin layer of bean splits, and removing said material from said thin layer of bean splits to thereby remove prickly weed seeds.
2. A method according to claim 1 wherein said thin layer is essentially a single layer deep.
3. A method according to claim 1 wherein said thin layer of bean splits is on a moving surface.
4. A method according to claim 3 wherein said foamed material is progressively pressed along said thin layer of bean splits.
5. A method according to claim 4 wherein said foamed material is formed into an endless band and said band is rolled over said thin layer of bean splits.
6. A bean split cleaner comprising
a planar surface; means for passing a thin layer of bean splits along said surface;
at least one soft, resilient foamed material body mounted above said surface;
means for pressing said body onto said layer of bean splits; and
means for removing said body from said thin layer of bean splits.
7. A bean split cleaner according to claim 6 wherein said means for passing said layer across said planar surface is an endless belt.
8. A bean split cleaner according to claim 7 wherein feeder means feeds essentially a single layer of bean splits on said belt conveyor.
9. A bean split cleaner according to claim 7 wherein said body is formed into an endless belt for rolling on said layer of bean splits.
10. A bean cleaner according to claim 9 being further defined by cleaning means for cleaning adhering material from said endless belt.
11. A bean cleaner according to claim 9 wherein said endless belt is a cylinder.
12. A bean cleaner according to claim 6 wherein two or more bodies are pressed onto said layer of bean splits.

* * * * *